Oct. 13, 1970    O. L. LINDBLAD    3,534,190
ADJUSTMENT MECHANISM FOR THE LENGTHWISE ADJUSTMENT OF THE
SAFETY BELT OF VEHICLES, ESPECIALLY MOTOR VEHICLES
Filed Sept. 30, 1968    2 Sheets-Sheet 1
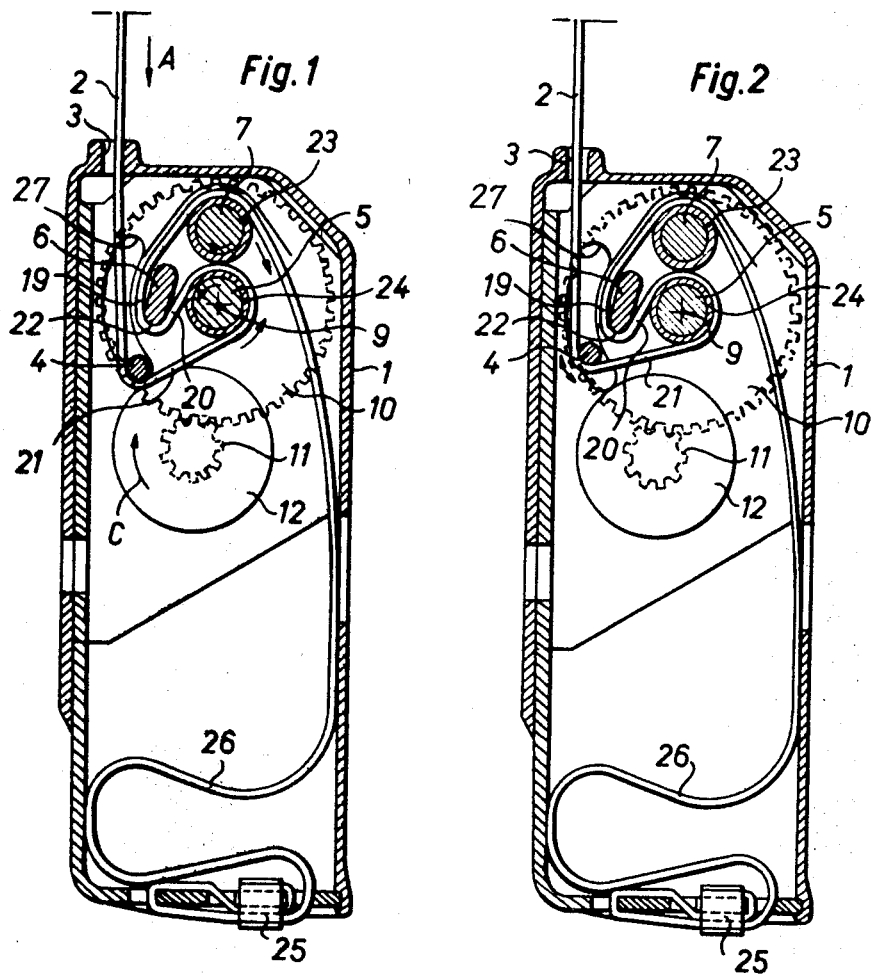
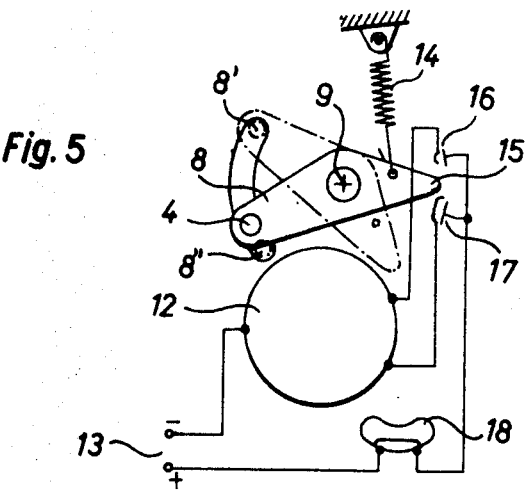
INVENTOR.
Oskar Lennart Lindblad
BY
Jacobi and Davidson
ATTORNEYS Oct. 13, 1970    O. L. LINDBLAD    3,534,190
ADJUSTMENT MECHANISM FOR THE LENGTHWISE ADJUSTMENT OF THE
SAFETY BELT OF VEHICLES, ESPECIALLY MOTOR VEHICLES
Filed Sept. 30, 1968    2 Sheets-Sheet 2
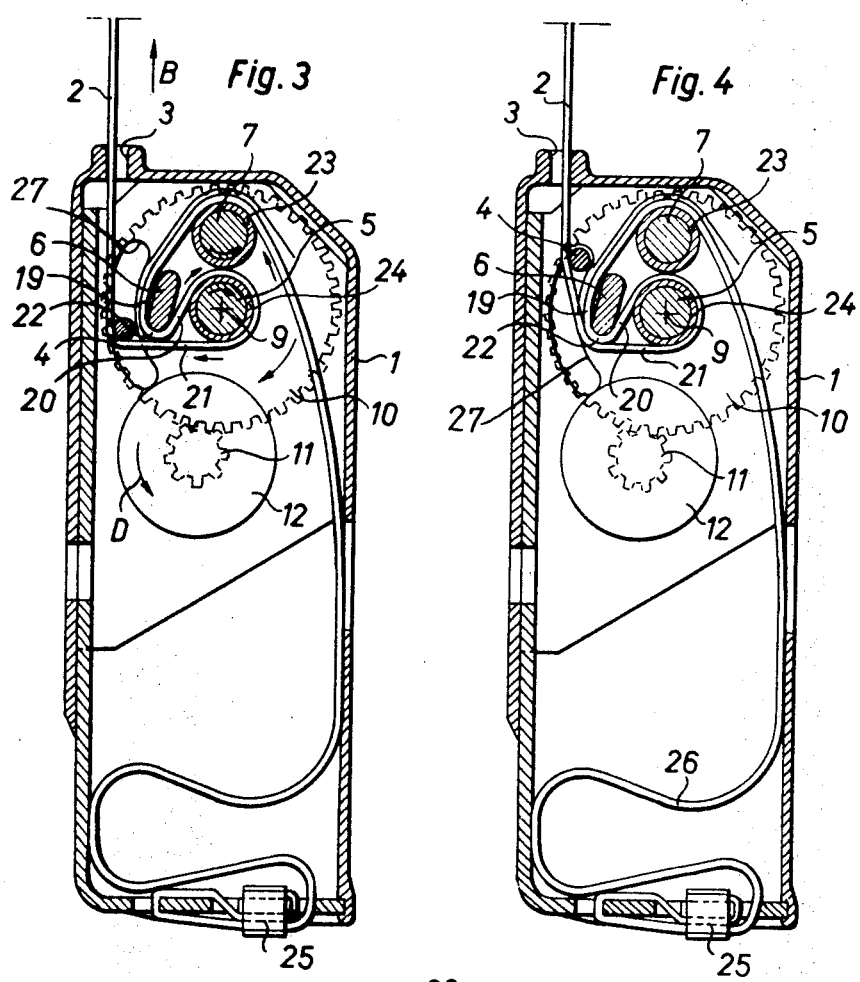
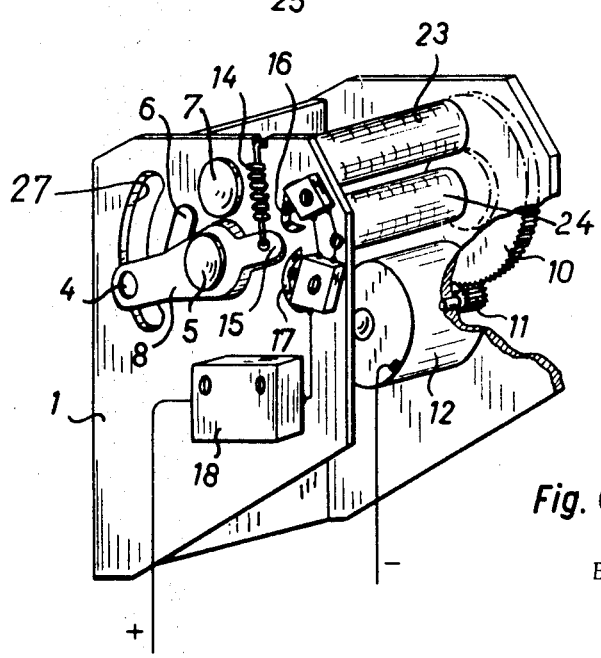
INVENTOR.
Oskar Lennart Lindblad
BY

United States Patent Office 3,534,190
Patented Oct. 13, 1970

3,534,190
ADJUSTMENT MECHANISM FOR THE LENGTH-
WISE ADJUSTMENT OF THE SAFETY BELT OF
VEHICLES, ESPECIALLY MOTOR VEHICLES
Oskar Lennart Lindblad, Hedasgatan, Vargarda, Sweden
Filed Sept. 30, 1968, Ser. No. 763,646
Claims priority, application Switzerland, Oct. 4, 1967,
13,891/67
Int. Cl. H01h 3/16
U.S. Cl. 200—61.58                     9 Claims

ABSTRACT OF THE DISCLOSURE

There is disclosed an apparatus for the lengthwise adjustment of the safety belt of vehicles, especially motor vehicles, which comprises feeler means for paying-out or drawing-in a safety belt as a function of the pull exerted thereon. Additionally, means are provided for blocking the safety belt from loosening when a sudden pull is exerted upon such safety belt.

BACKGROUND OF THE INVENTION

The present invention relates to a new and improved apparatus for the lengthwise adjustment of the safety belt, typically also referred to as the seat belt, of vehicles, especially motor vehicles.

It is a well known problem that, on the one hand, safety belts should be fitted as snugly as possible about the occupant of the vehicle in order to obtain the best results in the operation of such safety belt, without, on the other hand, impairing the freedom of movement of such occupant. With the conventional safety belts which are adjustable to a fixed predetermined length, these two requirements, which in essence contradict one another, can only be resolved through compromise and then not in a completely satisfactory manner.

SUMMARY OF THE INVENTION

Accordingly, it is a primary object of the present invention to provide an improved adjustment mechanism for safety belts of vehicles which enables fulfillment of both of the aforementioned requirements.

Another, more specific object of the present invention relates to an improved adjustment mechanism for the lengthwise adjustment of the safety belt of vehicles, especially motor vehicles, which is relatively simple in construction, is extremely reliable in operation, very safe in its use, easy to install, and not readily subject to breakdown.

Yet a further important aspect of the present invention relates to an improved adjustment mechanism or apparatus for the lengthwise adjustment of the safety belt of vehicles, wherein the belt can be paid-out or drawn-in as a function of the pull or traction force acting upon the belt, yet in the presence of a sudden jerk-like pull on the belt, such is blocked from loosening.

Now, in order to implement these and still further objects, which will become more readily apparent as the description proceeds, the inventive adjustment apparatus for the lengthwise adjustment of a safety belt is manifested by the features of a feeler means which serves to pay-out or draw-in safety belt as a function of the pull exerted upon such safety belt. Additionally, means serve to block the safety belt from loosening when a sudden pull is exerted upon such safety belt.

Due to the provision of a belt supply or storage means it is possible for the occupant of the vehicle to extend or shorten the belt, for instance by bending forward or leaning back, whereas the outfeed or paying-out of the belt is blocked in the presence of a sudden jerky-like load upon the belt.

BRIEF DESCRIPTION OF THE DRAWINGS

The invention will be better understood, and objects other than those set forth above will become apparent, when consideration is given to the following detailed description thereof. Such description makes reference to the annexed drawings wherein:

FIG. 1 is a longitudinal sectional view of a preferred embodiment of inventive apparatus shown in a position for drawing-in the belt into the belt supply or storage means;

FIG. 2 is a similar longitudinal sectional view of the apparatus of FIG. 1, but this time showing the components in their rest position;

FIG. 3 is a longitudinal sectional view of the apparatus of FIG. 1 in a position during outfeed or paying-out of the belt from the belt supply or storage means;

FIG. 4 depicts in longitudinal sectional view the apparatus of FIG. 1 with the components in their belt blocking position;

FIG. 5 is a schematic circuit diagram of the inventive apparatus; and

FIG. 6 is a perspective view of the apparatus.

DESCRIPTION OF THE PREFERRED EMBODIMENT

Describing now the drawings, it will be recognized that the exemplary embodiment of inventive apparatus incorporates a housing 1 which is rigidly mounted at the interior of the vehicle, for instance at the body frame, at a door post or at the floor of the automobile. The safety belt 2 departs from the interior of the housing 1 at the top through a slot 3. The one end of this safety belt 2 is secured by means of a clamp 25 to the inside of the housing 1, as shown. The other end of this belt 2 is operably connected in the usual manner with a releasable clasp or buckle, which to preserve clarity in illustration has been conveniently omitted from the drawings, in order that the safety belt 2 can be placed about an occupant of the vehicle.

As will be apparent by referring to the drawings, the safety belt 2 passes within the interior of the housing 1 over a deflecting roller 4 which is mounted at each of its ends upon pivotal lever member 8 to be pivotable about the axis 9, which axis is journalled at its opposite ends within the opposite side walls of the housing 1. Further, the safety belt 2 is trained about an additional belt deflecting or guiding roller 5 which is rotatable about its own axis, as well as about a stationary entrainment or wrap-around body member 6 and a counter-pressure roller member 7. As best seen in FIG. 6, the deflecting roller 4, at its opposite ends, passes through and is guided by a pair of respective arcuate slots 27 in the opposite side walls of the housing 1. The position of the deflecting roller 4 relative to the deflecting roller 5 is variable in that it can be rocked or pivoted between the positions indicated in FIGS. 1 and 4, respectively. Furthermore, the roller members 5 and 7 are advantageously equipped with a covering 24 and 23, respectively, which increases friction, so that during rotation of these roller members 5 and 7 there is ensured a proper feed or transport of the belt 2.

Continuing, it will be recognized that the deflecting roller 4 extends through a side wall of the housing 1 and is seated upon a double-arm pivotable lever member 8 which exterior of the housing 1 cooperates with the switch means 16 and 17 mounted on the exterior of this side wall, as best recognized by referring to FIG. 6. The belt deflecting or guiding roller 5 extends through the opposite wall of the housing 1 and is rigidly connected with a gear 10 exterior of the housing which likewise rotates about the axis 9. The pivotal lever member 8 is mounted for pivotal movement about this axis 9. The gear 10 meshes with a drive pinion 11 of an electric motor 12. The electric motor 12 is operably coupled with the terminals 13 of the schematically indicated battery of the motor vehicle. Motor 12 is a conventional reversible electric motor, and is wired so as to rotate in one direction to draw in the belt 2 when end portion 15 of lever member 8 closes switch 16, and to rotate in the opposite direction to pay out the belt 2 when end portion 15 closes switch 17, as will be further described hereunder.

Additionally, it will be seen that a tension spring 14 engages with the pivotal lever member 8 and strives to pull this pivotal lever member 8 in counterclockwise direction into the one terminal position 8" shown in FIG. 5. The end portion 15 of the double-arm pivotal switching lever 8 which is opposite the deflecting roller 4 serves for the selective actuation of both switch means or members 16 and 17. Furthermore, a mercury switch 18 is located in the electric circuit of the electric motor 12. This mercury switch 18 serves to only then close the electric current circuit when the level of the mercury is at least approximately horizontal, and therefore, no considerable acceleration or deceleration forces act upon the vehicle and furthermore, the vehicle has not turned over. It will therefore be understood that the mercury switch 18 serves the purpose of making the entire retractor unit sensitive to acceleration and deceleration forces. For example, if this retractor unit is mounted upon a safety-belt in a car which safety-belt is being used by a passenger, and the driver brakes the vehicle because of an apparent danger, then as soon as the car starts to decelerate, the mercury switch 18 will cut the current to the motor, thereby preventing the motor from turning and paying out the belt. The consequence will be that described according to FIG. 4, namely, that the belt is instantly blocked from paying out as soon as there is a major pulling force applied to it. This is an important factor inasmuch as the passenger could otherwise pull out an additional length of the belt, following the braking and before the possible impact, thereby reducing the effectiveness of the belt.

The mode of operation of the apparatus previously described is as follows: when the belt 2 extending out of the housing 1 is loose and should be drawn-in in the direction of the arrow A (FIG. 1), the spring member 14 causes the pivotal lever member 8 to rock in counterclockwise direction in FIG. 5, since the force of the spring is greater than the pull upon the belt. The arm or end portion 15 of the pivotal lever member 8 then closes the switch member 16 so that the electric motor 12 rotates in the direction of the arrow C of FIG. 1. The gear 10 is therefore also rotated and the belt 2 is retracted or drawn-in to the housing 1, as such is indicated in FIG. 1 by the depicted arrows. As soon as a force is exerted upon the belt 2 which acts against the drawing-in of the belt into the housing, then, the pivotal lever member 8 is rocked or pivoted in the opposite direction, in other words in clockwise direction, so that the switch member 16 is opened and the drive of the electric motor 12 is interrupted. This corresponds to the rest position, as such has been depicted in FIGS. 2 and 5.

When the traction or pulling force exerted upon the safety belt 2 increases because, for instance, the vehicle occupant moves or bends forward, then initially the pivotal lever member 8 is rocked in clockwise direction against the force of the spring member 14. The arm or end portion 15 of the pivotal lever member 8 then actuates the switch member 17, so that the electric motor 12 now rotates in the opposite direction, in other words, moves in the direction of the arrow D (FIG. 3) and the belt-supply 26 located within the housing 1 is paid-out or delivered in the direction of the arrow B of such FIG. 3. The safety belt 2 is paid-out in this manner until the counterforce of the spring 14 is predominate which then rocks the pivotal lever member 8 into the rest position, shown in solid lines in FIG. 5. As a result, the electric motor 12 is shut off. The described apparatus thus serves for the selective shortening or extension of the portion of the safety belt extending out of the slot 3 of the housing 1, and therefore, also serves for the comfortable fitting or accommodation of such belt to the momentary seated position of the vehicle occupant.

Now if the safety belt should protect the vehicle occupant against the consequences of a pronounced deceleration, then the outfeed or paying-out of the belt in the direction of the arrow B should be blocked, so that the safey belt will not tend to extend or become longer during a collision or the like. If such a velocity-deceleration of the vehicle occurs, for instance during an accident, then the belt 2 will tend to suddenly move in the direction of the arrow B, in other words will tend to move out of the slot 3 of the housing 1. In so doing, the roller member 4 together with the pivotal lever member 8 will be suddenly rocked in clockwise direction. Consequently, the belt portion 21 will snuggly bear against the belt portion 22 (FIG. 4). Since during movement of the belt 2 in the direction of the arrow B, both of these belt portions 21 and 22 at the region of the wrap-around body member 6 have a direction of motion which is opposite one another and tend to press against one another that much more strongly the larger the force is which tends to pull the belt out of the slot 3, there thus results a complete blocking of the belt. This corresponds to the position of the components depicted in FIG. 4. In this position the belt portion 2 cannot be pulled out of the housing 1, since the wrap-around angle between both of the belt portions moving in opposite directions is so large that a sliding of the belt portions upon one another is effectively prevented. In fact, it will be recognized that the belt is trained about the stationary member 6 through an angle greater than 90°. In the blocked position of the inventive apparatus shown in FIG. 4 the pivotal lever member 8 assumes the position 8' shown in phantom lines, whereby the switch member 17 remains switched out.

Naturally, instead of using an electric motor 12, it would also be possible to use a different type of drive motor, for instance, a hydraulic- or a pneumatically-operated motor or equivalent structure.

It should be apparent from the foregoing detailed description, that the objects set forth at the outset to the specification have been successfully achieved.

What is claimed is:

1. Apparatus for the lengthwise adjustment of the safety-belt of motor vehicles in response to tension exerted upon the safety-belt comprising means to selectively pay out or draw in the safety-belt; feeler means operatively associated with said first-named means for sensing the tension in the belt and to control the paying out and drawing in functions of said first-named means as a function of said tension; and means for blocking said paying out function when a sudde pulls is exerted on the belt.

2. Apparatus as defined in claim 1, wherein said first-named means includes drive motor means for drawing in and paying out the safety-belt.

3. Apparatus as defined in claim 2, wherein said feeler means comprises a movably mounted body member about which said safety-belt is trained, said body member being guided for limited movement in a path responsive to the pull exerted upon said safety-belt, said first named means including switch means, said movably mounted body member cooperating with said switch means in order to switch in or switch out said switch means dependent upon the position of said body member, to thus place into operation said drive motor means in order to bring about transport of said safety-belt in accordance with the direction of rotation of said drive motor means, said drive motor means being an electric motor which is selectively rotatable in opposite directions of rotation.

4. Apparatus as defined in claim 3, wherein said feeler means further includes a pivotal body member, spring means for loading said pivotal body member, said switch means including at least two switch members, each of which when closed activates said electric motor for rotation in a respective given direction, said spring means acting to bring said pivotal body member into a position in which that one of said switch members is closed which drives said electrict motor in a rotational sense which draws-in said safety belt.

5. Apparatus as defined in claim 1, wherein said feeler means incorporates a deflecting roller, said blocking means incorporating a stationary wrap-around body member, said apparatus further including a drive roller, said stationary wrap-around body member being disposed between said drive roller and said deflecting roller, said safety belt being guided about said stationary wrap-around body member; said deflecting roller cooperating with said stationary wrap-around body member in such a manner that during a sudden jerk-like pulling load upon the safety belt said deflecting roller moves into a position in which two oppositely travelling portions of the belt come to bear against one another at the region of the stationary wrap-around body member and therefore, block one another due to frictional contact.

6. Apparatus as defined in claim 4, further including a position-sensitive and deceleration-sensitive electric switch in series with said switch means and said electric motor, whereby said motor will be inactivated responsive to abnormal deceleration or abnormal position of the apparatus, and wherein said pivotal body member comprises a pivotal lever.

7. Apparatus as defined in claim 6, wherein said position-sensitive and deceleration sensitive electric switch comprises a mercury switch.

8. Apparatus as defined in claim 1, further including a drive roller, a gear, said drive roller being rigidly coupled with said gear, electric drive motor means including a pinion engaging with said gear, said blocking means incorporating a stationary body member about which is trained said belt, through an angle greater than 90°, said feeler means including a deflecting roller and a spring-loaded pivotal lever upon which said deflecting roller is mounted, a counterpressure roller for pressing the safety belt against said drive roller, said safety belt being successively trained about said deflecting roller, said drive roller, said stationary body member and said counterpressure roller, said deflecting roller being displaceable to one side from a starting position in which the outer surface of said drive roller, said stationary body member and the outer surface of said deflecting roller are located approximately along a straight line, in order to block two oppositely travelling portions of the safety belt, said deflecting roller being further displaceable to the other side in order to render possible a drawing-in or paying-out of the safety belt, and electric switch means for driving said electric drive motor means in one or the other rotational sense.

9. Apparatus as defined in claim 8, further including a housing, a supply of said safety belt located in said housing, said electric drive motor means, said pivotal lever, said deflecting roller and said counterpressure roller also being disposed within said housing.

References Cited

UNITED STATES PATENTS 3,185,246  5/1965  Maurer.
3,245,718  4/1966  Jasmer et al. _____ 297—388
3,293,396  12/1966  Boyd _____ 200—61.47 XR ROBERT K. SCHAFFER, Primary Examiner M. GINSBURG, Assistant Examiner U.S. Cl. X.R.

226—25; 280—150